United States Patent
Hilpipre, Jr.

[11] Patent Number: 5,285,830
[45] Date of Patent: Feb. 15, 1994

[54] MOTORCYCLE FUEL TANK EXTENSION ADAPTER

[76] Inventor: Lloyd C. Hilpipre, Jr., 1420 Pearl Ave. #2, Las Vegas, Nev. 89104

[21] Appl. No.: 861,566

[22] Filed: Apr. 1, 1992

[51] Int. Cl.⁵ .............................................. B67D 5/06
[52] U.S. Cl. ................................ 141/312; 141/383; 141/95; 220/86.1; 220/86.2; 73/319; 116/228; 280/835; 277/72 FM
[58] Field of Search ............... 141/312, 331, 332, 340, 141/341, 368, 383, 385, 386, 311 A, 390–392, 95, 98; 403/201, 327; 137/592; 280/288.4, 835; 220/86.2, 86.1, 326, DIG. 33; 285/84–87, 210, 320; 277/72 FM; 73/319; 116/228

[56] References Cited

U.S. PATENT DOCUMENTS

| | | | |
|---|---|---|---|
| 998,352 | 7/1911 | Kublin | 141/383 X |
| 2,517,759 | 8/1950 | Bentzen | 141/383 X |
| 3,104,777 | 9/1963 | Pottash | 220/86.1 |
| 3,814,147 | 6/1974 | Lindberg | 141/392 X |
| 4,234,098 | 11/1980 | Miller et al. | 220/86.2 |
| 4,901,776 | 2/1990 | Attinello | 141/95 |
| 5,123,557 | 6/1992 | Drawbaugh | 220/86.2 X |

Primary Examiner—J. Casimer Jacyna
Attorney, Agent, or Firm—Leon Gilden

[57] ABSTRACT

An adapter tube is arranged for mounting to a motorcycle tank to accommodate the elongate nozzle portion of a gasoline fill valve. The apparatus includes locking structure arranged to secure the gas tank adapter into the associated gas tank.

5 Claims, 4 Drawing Sheets

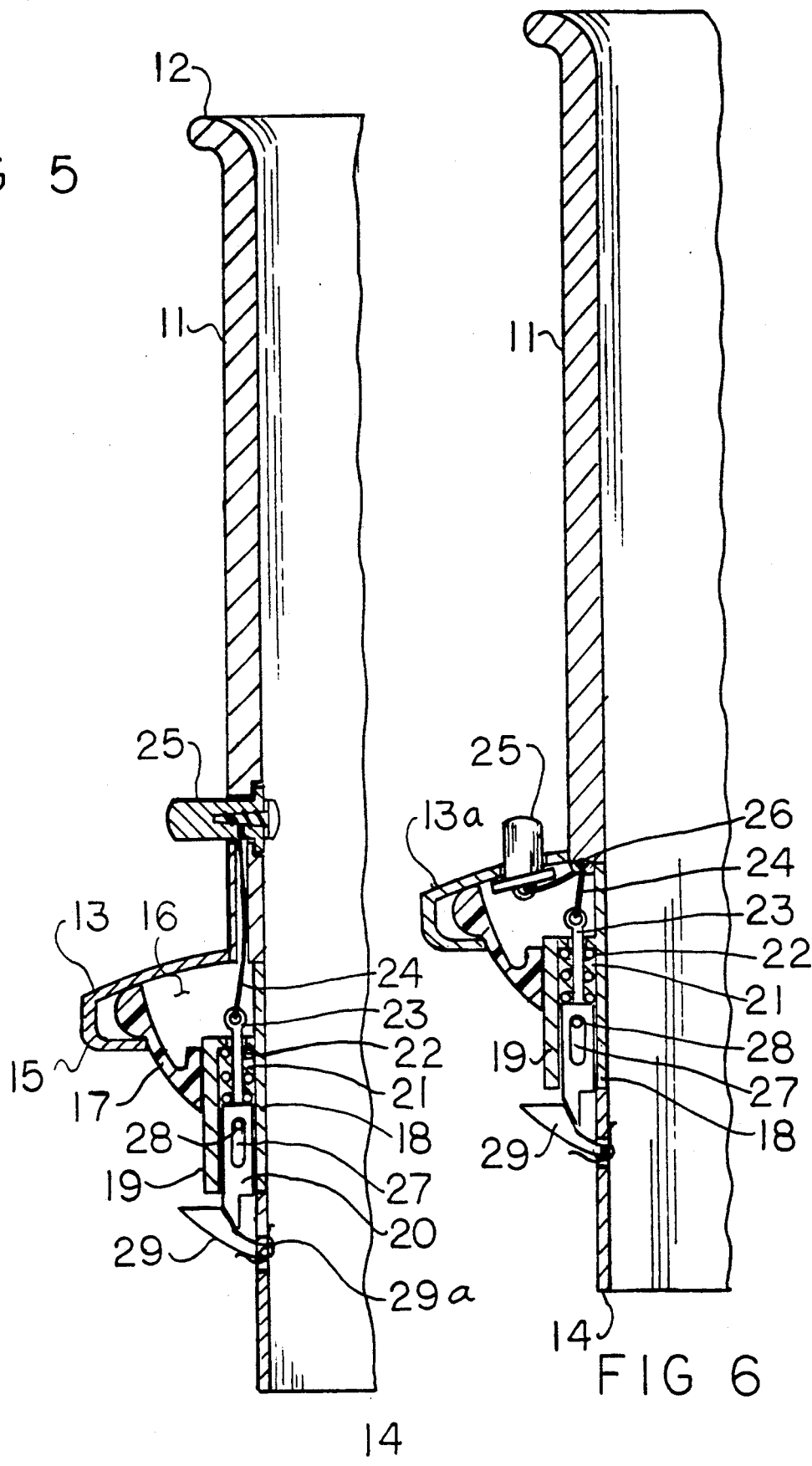

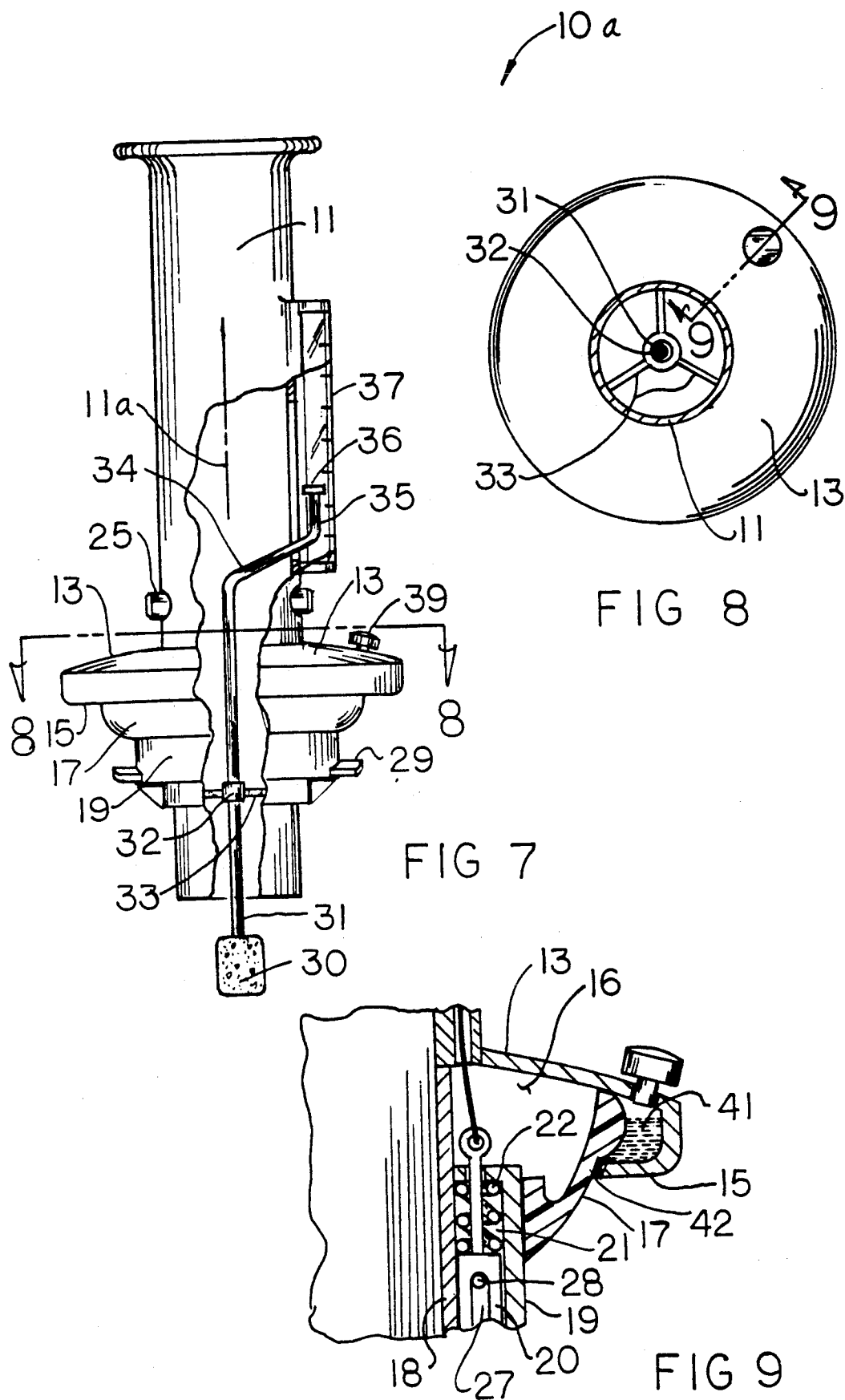

MOTORCYCLE FUEL TANK EXTENSION ADAPTER

BACKGROUND OF THE INVENTION

1. Field of the Invention

The field of invention relates to fuel tank apparatus, and more particularly pertains to a new and improved motorcycle fuel tank extension adapter wherein the same is arranged to permit accommodation of a fuel tank fuel nozzle of an associated gasoline tank.

2. Description of the Prior Art

The filling of a motorcycle gas tank is such that spillage upon the gas tank is an ever-present concern, and more importantly, a new generation of fuel fill nozzles of gasoline pumps require an associated bellows on the nozzle to be retracted rearwardly prior to the nozzle becoming operational as a portion of structure relative to new gasoline nozzle arrangements to minimize fuel vapors from entering and escaping the atmosphere surrounding a fuel filling procedure. In an attempt to address deficiencies of the prior art, the instant invention provides for a readily mounted adapter structure securable to an associated motorcycle gas tank. The prior art employs various inserts relative to a fuel tank and such is set forth in U.S. Pat. No. 3,730,216 to Arnett, et al. wherein an insert is mounted fixedly within a fuel tank to permit filling the tank with a proper fuel by accommodating a limited diameter nozzle therewithin.

U.S. Pat. No. 3,951,315 to Glodek sets forth a fuel pump nozzle having an anti-dribble device effecting closure of the nozzle subsequent to a filling procedure.

U.S. Pat. No. 3,695,480 to Castiglia sets forth a motorcycle gas tank closure device.

U.S. Pat. No. 4,802,516 to Dahlen sets forth a nozzle locking gas cap to be directed into a fuel fill nozzle to accommodate a variety of nozzle structures, as well as controlling rate of fuel filling from the nozzle structure.

Accordingly, it may be appreciated that there continues to be a need for a new and improved motorcycle fuel tank extension adapter as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fuel tank apparatus now present in the prior art, the present invention provides a motorcycle fuel tank extension adapter wherein the same is arranged to provide for an extension tube relative to a motorcycle fuel tank. As such, the general purpose of the present invention, which will be described subsequently in greater detail, is to provide a new and improved motorcycle fuel tank extension adapter which has all the advantages of the prior art fuel tank apparatus and none of the disadvantages.

To attain this, the present invention provides an adapter tube arranged for mounting to a motorcycle tank to accommodate the elongate nozzle portion of a gasoline fill valve. The apparatus includes locking structure arranged to secure the gas tank adapter into the associated gas tank.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved motorcycle fuel tank extension adapter which has all the advantages of the prior art fuel tank apparatus and none of the disadvantages.

It is another object of the present invention to provide a new and improved motorcycle fuel tank extension adapter which may be easily and efficiently manufactured and marketed.

It is a further object of the present invention to provide a new and improved motorcycle fuel tank extension adapter which is of a durable and reliable construction.

An even further object of the present invention is to provide a new and improved motorcycle fuel tank extension adapter which is susceptible of a low cost of manufacture with regard to both materials and labor, and which accordingly is then susceptible of low prices of sale to the consuming public, thereby making such motorcycle fuel tank extension adapters economically available to the buying public.

Still yet another object of the present invention is to provide a new and improved motorcycle fuel tank extension adapter which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic cross-sectional illustration of the mounting housing structure of the invention.

FIG. 6 is an orthographic cross-sectional illustration of a modified mounting housing of the invention.

FIG. 7 is an orthographic view, partially in section, of a modified aspect of the invention.

FIG. 8 is an orthographic view, taken along the lines 8—8 of FIG. 7 in the direction indicated by the arrows.

FIG. 9 is an orthographic view, taken along the lines 9—9 of FIG. 8 in the direction indicated by the arrows.

DESCRIPTION OF THE PREFERRED EMBODIMENT

Figure 1:
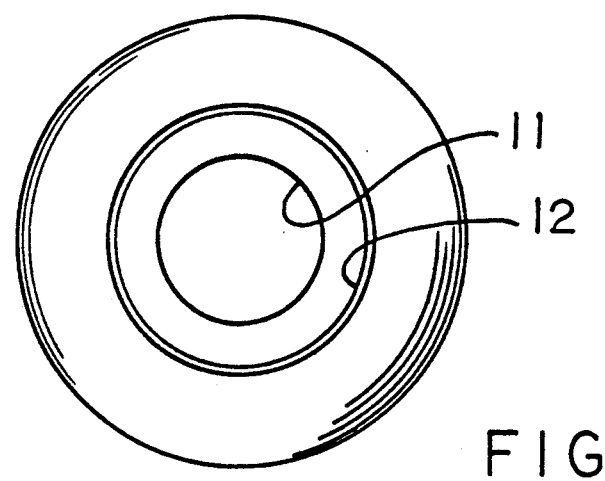
FIG. 1 is an orthographic top view of the instant invention.
Figure 2:
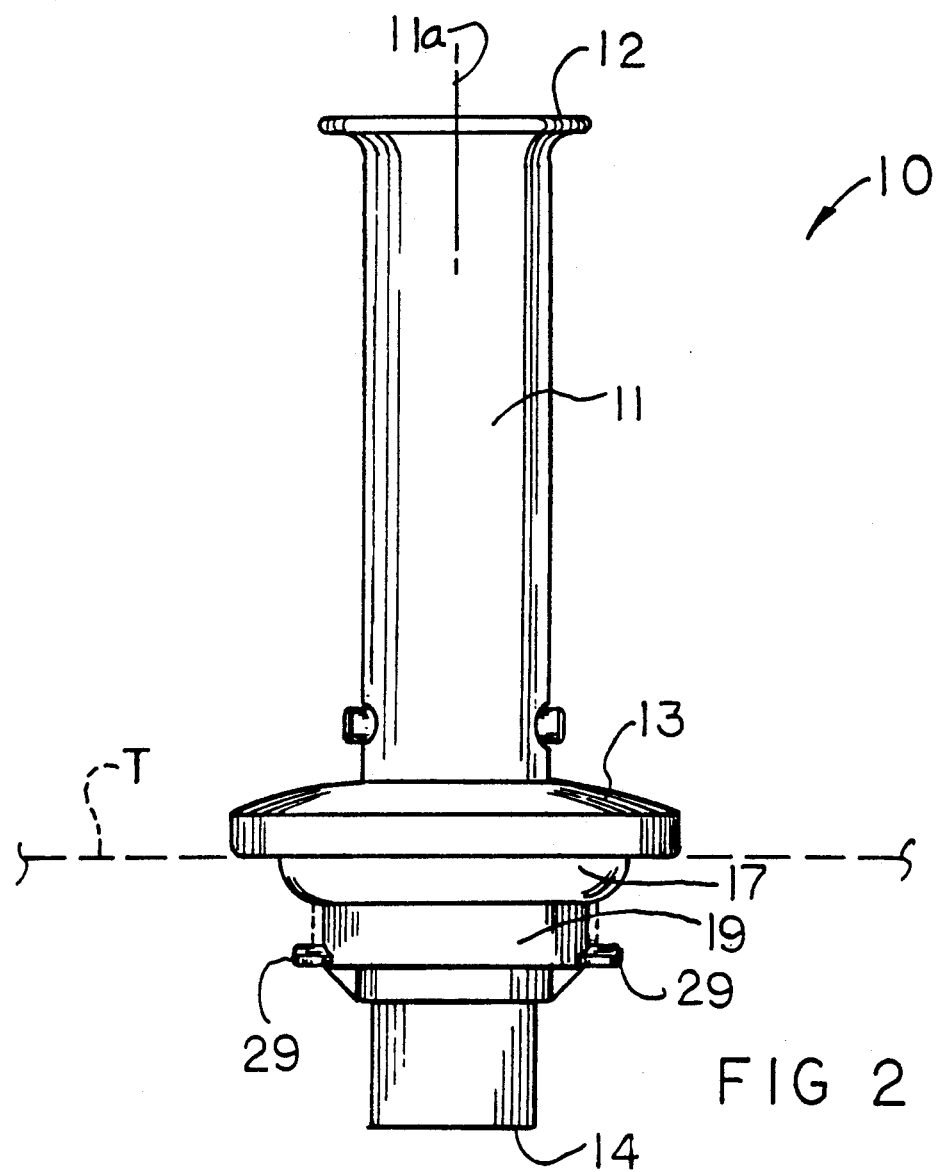
FIG. 2 is an orthographic view, taken in elevation, of the instant invention.
Figure 3:
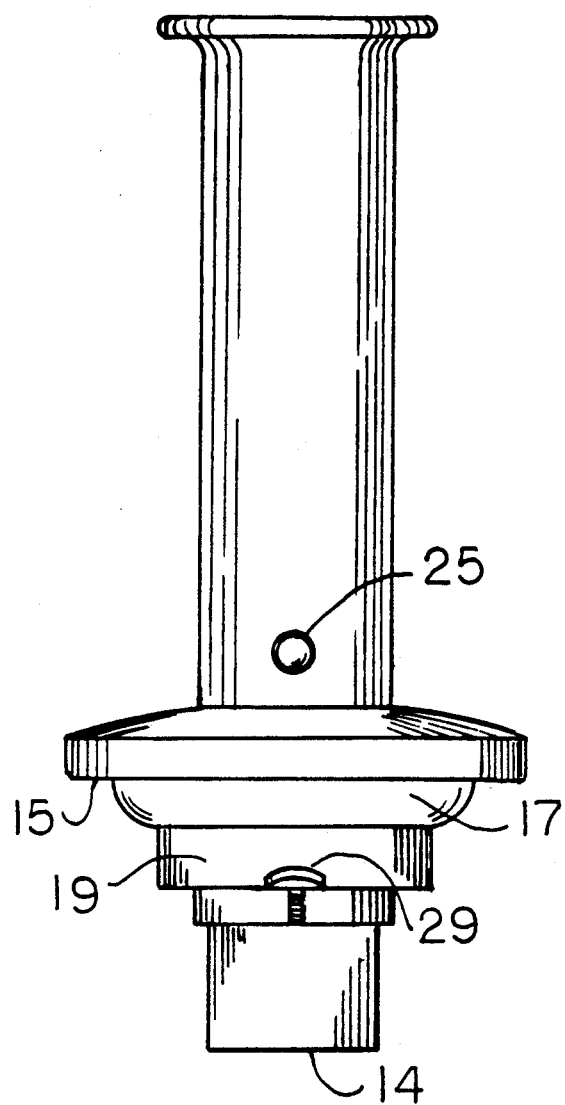
FIG. 3 is an orthographic view of the invention rotated ninety degrees, as set forth in FIG. 2.
Figure 4:
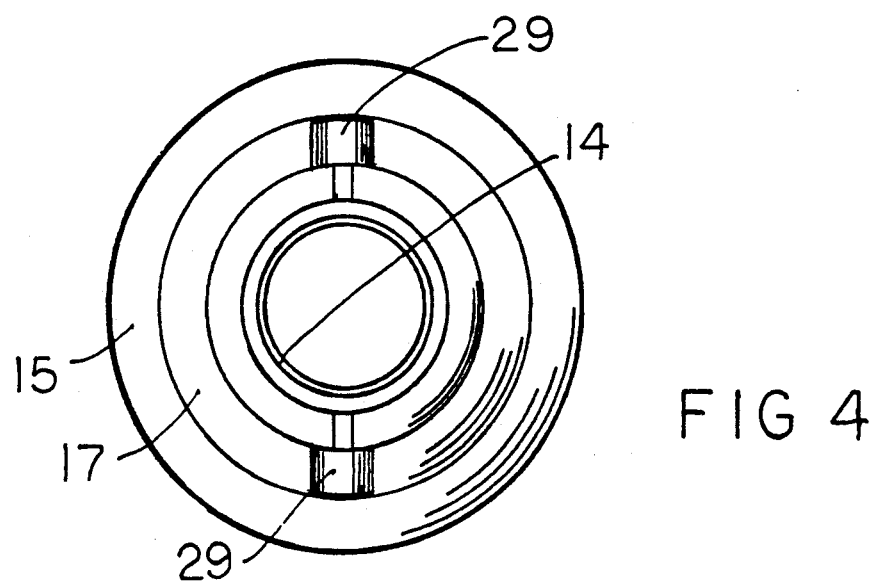
FIG. 4 is an orthographic bottom view of the invention.

With reference now to the drawings, and in particular to FIGS. 1 to 9 thereof, a new and improved motorcycle fuel tank extension adapter embodying the principles and concepts of the present invention and generally designated by the reference numerals 10 and 10a will be described.

More specifically, the motorcycle fuel tank extension adapter 10 of the instant invention essentially comprises a fill tube 11 formed about an axis 11a having an outwardly flared upper end 12. A mounting housing 13 is fixedly mounted in surrounding relationship relative to the fill tube 11 spaced from a fill tube lower distal end 14. An annular housing flange 15 of the housing 13 is orthogonally oriented relative to the axis 11a and spaced from the fill tube 11, with a housing cavity 16 formed within the mounting housing 13 having a conical seal 17 extending from the housing cavity 16 above the housing flange 15 downwardly onto the fill tube 11.

Reference to the FIG. 5 for example illustrates the use of a housing inner cylindrical sleeve 18 coincident with the fill tube 11 concentric relative to a housing outer sleeve 19 defining a locking lug cavity 21 therebetween having a locking lug 20 reciprotatably mounted within the cavity in a parallel relationship relative to the axis 11a. A locking lug spring 22 captured within the locking lug cavity 21 and the locking lug 20 normally biases the locking lug exteriorly of the locking lug cavity 21. A locking lug rod 23 fixedly mounted to a top surface of the locking lug 20 extends through the locking lug cavity 21 into the housing cavity 16, wherein a flexible pull line 24 is mounted to an upper distal end of the locking lug rod 23 and in turn mounted to a button member 25 mounted within the fill tube 11. Alternatively, the button member 25 may be mounted within a modified housing 13a, such as illustrated in FIG. 6, with the flexible pull line 24 slidably guided through a pull line guide opening 26 above the locking lug rod 23 at an upper end of the cavity 16. In this manner, deflection of the button member 25 lifts the locking lug 20, whereupon the locking tabs 29 that are directed through the gas tank "T" are raised by locking tab spring hinges 29a that pivotally mount each locking tab 29 to the fill tube 11 below the mounting housing 13. The locking tabs 29 are diametrically mounted relative to the fill tube 11 below the mounting housing 13, as illustrated in the FIG. 2 for example. It should be further noted that the locking lug 20 includes a locking lug slot 27 oriented in a parallel relationship relative to the axis 11a guided and aligned within the locking lug cavity 21 by a guide pin 28 mounted within the locking lug slot 27.

The apparatus 10a, as illustrated in the FIGS. 7-9, further includes a float 30 extending below the fill tube lower distal end 14, including a float rod first section 31 coaxially aligned relative to the axis 11a and slidably guided through a guide bushing 32 that is mounted within the fill tube 11 by a plurality of support rods 33 radially directed into the guide bushing 32 relative to the housing axis 11a. A float rod second section 34 is oriented at an obtuse angle relative to the first section 31, with a float rod third section 35 defining an obtuse angle relative to the second section 34, with the third section 35 oriented parallel and spaced from the first section 31 above the first section and directed into a transparent sight tube 37. An indicator cap 36 mounted to an upper distal end of the third section 35 reciprocates within the transparent sight tube 37 dependent upon fuel level within the associated gas tank "T" below the annular flange 15. A sight tube slot 38 receives a third section 34 as the sight tube slot 38 is arranged through the fill tube 11 adjacent the transparent sight tube 37.

Further, a viscous fluid reservoir 41 is defined within the housing 13 between the conical seal 17 and the outer periphery of the housing 13 within the housing cavity 16. A fill cap 39 permits replenishment of the viscous fluid therewithin, typically of a petroleum base fluid that is directed along the outer surface of the conical seal 17 through a circular outlet 42 formed in a spaced relationship between the flange 15 and the seal 17 to permit seepage of the viscous fluid along the outer surface of the seal 17 for enhanced sealing of the seal relative to the gas tank, as well as maintaining the seal to ensure sealing relative to an associated gas tank "T".

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A motorcycle fuel tank extension adapter arranged for reception within a motorcycle fuel tank, wherein the adapter comprises, a fill tube, the fill tube defined about an axis, the fill tube including a lower distal end and a mounting housing fixedly secured to the fill tube in surrounding relationship concentric relative to the axis above the lower distal end, the mounting housing including a plurality of spaced locking tabs directly radially relative to the axis projecting from the housing in a diametrically aligned relationship relative to the fill tube and the mounting housing, and the mounting housing includes an annular housing flange orthogonally oriented relative to the axis and spaced from the fill tube, and the mounting housing including a housing cavity within the mounting housing above the annular flange, with a conical seal positioned within the housing cavity extending downwardly to the fill tube, and the mounting housing includes a mounting housing inner cylindrical sleeve aligned with the fill tube, and a housing outer sleeve concentric and coextensive relative to the inner cylindrical sleeve, and each locking tab including a locking lug reciprocatably mounted within the locking lug cavity in biased communication with the respective locking tab, with each locking lug including a locking lug spring within the locking lug cavity biasing the locking lug exteriorly of the locking lug cavity, and each locking tab pivotally mounted to the fill tube below the mounting housing, with a spring hinge pivotally mounting the locking tab in a biased relationship towards the fill tube, and each locking lug including a locking lug rod fixedly mounted to the locking lug, with the locking lug rod extending through the locking lug cavity and extending into the housing cavity, and each upper distal end of each locking lug rod including a flexible pull line mounted thereto, the flexible pull line extending through the housing cavity and secured to a button member, with each button member directed into the fill tube, whereupon manually directing each button member into the fill tube effects displacement of each locking lug relative to a respective locking tab permitting upward pivotment of each locking tab.

2. An adapter as set forth in claim 1 wherein each locking lug includes a locking lug slot, and a slot guide pin mounted within each slot limits vertical reciprocation of each locking lug within the locking lug cavity.

3. An adapter as set forth in claim 2 including a float member, the float member including a float rod first section coaxially aligned with the axis extending into the fill tube, and the rod first section includes a rod second section fixedly mounted to the rod first section at an obtuse angle thereto, and a rod third section fixedly mounted to the rod second section at a further obtuse angle relative to the second section, and a transparent sight tube projecting exteriorly of the fill tube above the mounting housing, with the transparent sight tube and fill tube including a sight tube slot directed through the fill tube into the sight tube, with the rod third section extending through the sight tube slot into the sight tube.

4. An adapter as set forth in claim 3 wherein the rod first section includes a guide bushing slidably receiving the rod first section therethrough, the guide bushing including at least one support rod radially aligned relative to the axis secured between the fill tube and the guide bushing to position the guide bushing in a coaxially aligned relationship relative to the axis.

5. An adapter as set forth in claim 4 including a viscous fluid reservoir positioned between the conical seal and an outer periphery of the mounting housing spaced above the annular flange, with a fill cap directed into the viscous fluid reservoir to permit replenishment of the viscous fluid reservoir with a viscous fluid, and a circular outlet oriented in fluid communication with the viscous fluid reservoir between the annular flange and the conical seal to permit seepage of a viscous fluid contained within the viscous fluid reservoir onto the conical seal.

* * * * *